(12) United States Patent
Brada et al.

(10) Patent No.: US 12,013,294 B2
(45) Date of Patent: Jun. 18, 2024

(54) TWO-DIMENSIONAL FORCE SENSOR FOR MEASURING FIRST AND SECOND FORCES IN A FIRST AND SECOND DIRECTION

(71) Applicant: KONINKLIJKE PHILIPS N.V., Eindhoven (NL)

(72) Inventors: Ype Bernardus Brada, Leeuwarden (NL); Maurits Koenen, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 344 days.

(21) Appl. No.: 17/438,982

(22) PCT Filed: Mar. 4, 2020

(86) PCT No.: PCT/EP2020/055612
§ 371 (c)(1),
(2) Date: Sep. 14, 2021

(87) PCT Pub. No.: WO2020/182554
PCT Pub. Date: Sep. 17, 2020

(65) Prior Publication Data
US 2022/0155158 A1    May 19, 2022

(30) Foreign Application Priority Data
Mar. 14, 2019    (EP) .................................... 19162992

(51) Int. Cl.
*G01L 1/12*    (2006.01)
*G01L 1/22*    (2006.01)
(Continued)

(52) U.S. Cl.
CPC .................. *G01L 1/12* (2013.01); *G01L 1/22* (2013.01); *G01L 5/164* (2013.01); *G01L 5/169* (2020.01)

(58) Field of Classification Search
CPC ........ G01G 3/1412; G01G 3/12; G01G 21/24; G01L 5/009; G01L 1/2231; G01L 5/106;
(Continued)

(56) References Cited

U.S. PATENT DOCUMENTS 3,946,606 A    3/1976 Abrioux
4,478,089 A    10/1984 Aviles
(Continued)

FOREIGN PATENT DOCUMENTS

FR    2442607 A1    6/1980
JP    2014023920 A    2/2014

OTHER PUBLICATIONS

International Search Report and Written Opinion, International Application No. PCT/ EP2020/055612, Mailed on May 29, 2020.

*Primary Examiner* — Brandi N Hopkins

(57) ABSTRACT

A two-dimensional force sensor for measuring a first force in a first direction and a second force in a second direction. The sensor comprises a first resilient plate oriented in the second direction, a first end of the first resilient plate being arranged for being coupled to a reference point; a second resilient plate oriented in the first direction, a first end of the second resilient plate coupled to a second end of the first resilient plate and a measurement probe coupled to a second end of the second resilient plate. The measurement probe is mounted on an extension device mounted to the second end of the second resilient plate. The extension device positions the measurement probe at a position deviating from an imaginary cross-section point of the first resilient plate and the second resilient plate by no more than 20% of a length of the extension device.

7 Claims, 6 Drawing Sheets

(51) Int. Cl.
*G01L 5/164* (2020.01)
*G01L 5/169* (2020.01)

(58) Field of Classification Search
CPC . G01L 1/00; G01L 1/22; G01L 1/2243; G01L 1/142; G01L 1/12; G01L 1/048; G01B 7/18; G01B 7/012; G01N 3/56
See application file for complete search history.

(56) References Cited

U.S. PATENT DOCUMENTS

| | | | |
|---|---|---|---|
| 5,230,252 A | 7/1993 | O'Brien | |
| 6,173,615 B1 | 1/2001 | Takahashi | |
| 2011/0107850 A1* | 5/2011 | Kim | G01L 5/163 73/862.041 |
| 2015/0209159 A1* | 7/2015 | Goldfarb | A61F 2/66 73/862.541 |
| 2016/0334288 A1 | 11/2016 | Berme | |
| 2017/0299451 A1* | 10/2017 | Gouko | G01L 1/005 |

* cited by examiner

TWO-DIMENSIONAL FORCE SENSOR FOR MEASURING FIRST AND SECOND FORCES IN A FIRST AND SECOND DIRECTION

CROSS REFERENCE TO RELATED APPLICATIONS

This application is the U.S. National Phase application under 35 U.S.C. § 371 of International Application No. PCT/EP2020/055612, filed on Mar. 4, 2020, which claims the benefit of European Patent Application No. 19162992.2, filed on Mar. 14, 2019. These applications are hereby incorporated by reference herein.

FIELD OF THE INVENTION

The invention relates to a two-dimensional force sensor.

BACKGROUND OF THE INVENTION

U.S. Pat. No. 4,478,089A discloses a multi-degree of freedom force transducer for measuring forces applied to gripper fingers in a manipulator when grasping an object therebetween. The transducer includes a pair of force sensor assemblies rigidly connected at a first end to a respective finger and at a second end to a drive member for the gripper. A plurality of parallel beam structures are contained in each of the force sensor assemblies, each consisting of a pair of flat parallel flexure members, each member bridging opposite sides of a gap in the structure. These parallel beam structures are oriented so that the axis perpendicular to the planar surfaces of the parallel flexure members are orthogonal to one another, providing the capability of measuring the force applied to an object held by the gripper in the X, Y and Z axial directions. A strain gage of a pair of strain gages is located at a predetermined opposite maximum flexure point of each flexure member of said parallel beam structures, so as to measure the flexure of the member at the predetermined flexure points, which flexure is indicative of the force vector along the axis perpendicular to the parallel flexure members. In another embodiment the junction between the flexure member and the wall of the strain gage assembly is radiused or curved so that the maximum flexure point is spread out, giving longer life and enhanced measurement accuracy.

US2016334288A1 discloses a load transducer includes a body portion having a plurality of sides, the plurality of sides of the body portion including a first side; a plurality of beam portions including a first beam portion and a second beam portion, the first beam portion being coupled to the body portion, the second beam portion being coupled to the first beam portion, and the second beam portion extending along the first side of the body portion; and at least one load cell disposed on one or more of the plurality of beam portions, the at least one load cell configured to measure at least one force or moment component of a load applied to the load transducer. A force measurement assembly including a plurality of load transducers with first and second beam portions is also disclosed.

U.S. Pat. No. 3,946,606A discloses a device for measuring the force required to untangle hair.

FR2442607A1 discloses a flexible plastic comb that has a metallic plate riveted to it and which supports a sensor comprising four strain gauges connected in a bridge arrangement.

U.S. Pat. No. 5,230,252A discloses a load cell that incorporates two identical sensing beams equipped with resistance-type strain gauges.

U.S. Pat. No. 6,173,615B1 discloses a sensing device for measuring a load on a vehicle in two directions simultaneously.

The earlier application PCT/EP2018/074558 discloses a two-dimensional force sensor for use in a hair styling or analyzing device.

SUMMARY OF THE INVENTION

It is, inter alia, an object of the invention to provide an improved two-dimensional force sensor. The invention is defined by the independent claims. Advantageous embodiments are defined in the dependent claims.

One aspect of the invention provides a two-dimensional force sensor for measuring a first force in a first direction and a second force in a second direction different from the first direction. The two-dimensional force sensor comprises a first resilient structure (e.g. plate or beam) oriented in the second direction, a first end of the first resilient structure being arranged for being coupled to a reference point; a second resilient structure oriented in the first direction, a first end of the second resilient structure being coupled to a second end of the first resilient structure; and a measurement probe being coupled to a second end of the second resilient structure.

According to embodiments of the invention, the first and/or second resilient structure are resilient plates. Using resilient plates results in a relatively low weight compared to shear type load cells, so that the own mass of the two-dimensional force sensor components influences the measurement result to a far lesser extent. The first and second resilient plates may be part of one plate that is suitably shaped (e.g. curved), or two different plates that are suitably connected to one another.

According to other embodiments of the invention, the first and/or second resilient structure are beams comprising a bending zone. A bending zone is a zone in the beam that is configured for bending when a load is applied to the beam. This can for example be achieved by reducing the width and/or height of the beam at the location of the bending zone compared to the rest of the beam.

An important difference between embodiments of present invention and the prior art is that according to embodiments of the invention, the end of a structure is bending under an angle to the other end of the structure instead of parallel translating relative to the other end of the beam as seen in the shear type resilient beams Various embodiments of the invention provide the following advantages. The two-dimensional force sensor according to embodiments of the invention provides the advantage that the two-dimensional force sensor is more robust than a solution that employs shear type load cells, which may be damaged in case a hair styling or analyzing device comprising such a two-dimensional force sensor drops on the floor.

The force sensor may be particularly advantageous for the use in haircare devices, because it may be used to measure parameters that are associated with hair health or hair health as perceived by the consumer. The force sensor may also be advantageous in the field of personal care, like for example in skincare. In addition, the force sensor may be used in the field of machinery.

The measurement probe is mounted on an extension device mounted to the second end of the second resilient structure, the extension device being shaped for positioning the measurement probe at a position deviating from an imaginary cross-section point of a neutral axis of the first resilient structure and a neutral axis of the second resilient structure by no more than 20%, preferably 10%, and more preferably 5%, of a length of the extension device.

The neutral axis is an axis in the cross section of a structure along which there are no longitudinal stresses or strains. If the section is symmetric, isotropic and is not curved before a bend occurs, then the neutral axis is at the geometric centroid. All fibers on one side of the neutral axis are in a state of tension, while those on the opposite side are in compression. Hence, in the situation wherein the resilient structures are plates, the imaginary cross-section point of the neutral axis of the first resilient plate and the neutral axis of the second resilient plate will be approximately at the same location as the imaginary cross-section point of the two resilient plates.

Positioning the measurement probe at a position as close as possible to this cross-section point provides the advantage of a maximal reduction in cross-talk, i.e. that a force in one direction triggers a false (undesired) measurement of a force in the other direction. Measurements have shown that 1% deviation in the position results in a measurement error of about 1%. Manufacturing tolerances may prevent the measurement probe from being positioned at the optimal position of exactly at the imaginary cross-section point of the first resilient plate and the second resilient plate.

The first resilient structure may be provided with a first strain measurement unit to measure the first force, and the resilient second structure may be provided with a second strain measurement unit to measure the second force. This is a very simple and yet accurate execution of the two-dimensional force measurement. The strain measurement unit may include a set of two half bridge strain gauges (most suitable for plate embodiments) on either side of the resilient structures, or one full bridge strain gauge (most suitable for beam embodiments) on one side of the resilient structures. The use of a single strain gauge on both sides, creating a half bridge, is alternatively possible but more sensitive to temperature. A half bridge strain gauge on one side is also possible but (depending on the execution) less sensitive or more sensitive to temperature.

The first resilient structure and the second resilient structure may have a reduced width at positions where the first resilient structure and the second resilient structure have been provided with the first and second strain measurement units, respectively. This provides the advantage of a well-defined bending zone in the first and second resilient structures.

In an alternative embodiment, the two-dimensional force sensor further comprises a transducer for sensing a position deviation of the measurement probe to measure the first force and the second force. A good and affordable transducer comprises a Hall effect sensor for sensing a position deviation of a magnet that is coupled to the measurement probe.

The first resilient plate and the second resilient plate may be made from a single resilient plate that is shaped to have a first section (forming the first resilient plate) oriented in the second direction, and a second section (forming the second resilient plate) oriented in the first direction.

A hair styling or analyzing device of the type described in the earlier application PCT/EP2018/074558 is advantageously provided with such a two-dimensional force sensor.

These and other aspects of the invention will be apparent from and elucidated with reference to the embodiments described hereinafter.

DESCRIPTION OF EMBODIMENTS

Figure 1A:
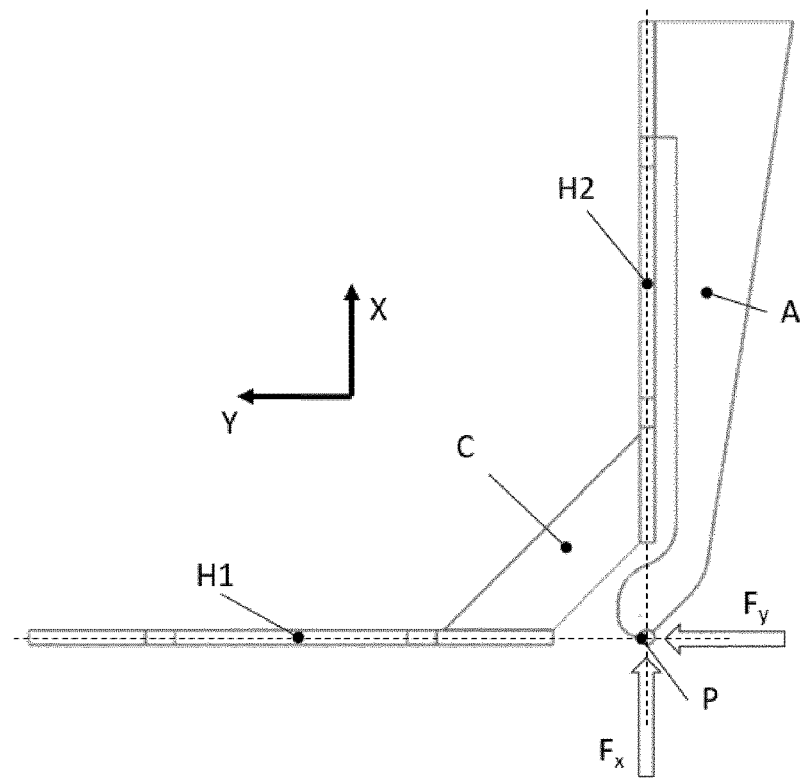
FIGS. 1-9 show various embodiments of a two-dimensional force sensor in accordance with the present invention.

Various embodiments of the invention aim to provide a two-dimensional force sensor that is able to independently measure forces in two different directions that are e.g. perpendicular (90°) to each other, without any significant crosstalk. In various embodiments, this feature is obtained by mounting two resilient structures H1, H2 perpendicular to each other, and bringing the position where the forces Fx, Fy are induced (measurement probe P) exactly in line with both resilient structures H1, H2. The deformation of the resilient structures H1, H2 can be measured with a variety of transducers, e.g. with strain gauges. In various embodiments, the two resilient structures H1, H2 are mounted perpendicular to each other. This can be done with a separate connection element C between the resilient structures H1, H2. Alternatively, the resilient structures H1, H2 can be made out of one plate that is bent under a 90° angle. Advantageously, the two resilient structures H1, H2 are mounted in such way, that the position where the two resilient structures H1, H2 would intersect one another, is available for placing the measurement probe P where the forces $F_X$, $F_Y$ to be measured can be induced. Advantageously, an extension device formed by an arm A positions the measurement probe P at a position in line with the two resilient structures H1, H2. In one embodiment, the length of the arm A is about 2 cm.

When a force $F_X$ is induced on the measurement probe P in the X direction, the resilient structure H2 is loaded in push/pull direction and no momentum, so no deformation of the resilient structure H2 in the Y direction. When a force $F_X$ is induced in the X direction, the resilient structure H1 is loaded in pure bending direction and will deform in the X direction. The deformation in the Y direction is limited to a so-called cosine error and is negligible when the deformation due to bending of the resilient structure H1 in the X direction is relative small.

When a force $F_Y$ is induced on the measurement probe P in the Y direction, the resilient structure H1 is loaded in push/pull direction and no momentum, so no deformation of the resilient structure H1 in the X direction. When a force $F_Y$ is induced in the Y direction, the resilient structure H2 is loaded with a momentum and a force. Depending on the execution of the resilient structure H2, there will be a single or double bend in the resilient structure H2 creating a deformation in the Y direction. The deformation of the resilient structure H2 in the X direction is limited to a so-called cosine error and is negligible when deformation due to bending of the resilient structure H2 in the X direction is relative small.

The resilient structures H1, H2 are simple in geometry, which enables that the resilient structures H1, H2 can be made from various materials, e.g. high strength steel, but every material is possible when it fulfills certain properties.

When the sensor is used in various orientations or is used in a dynamic environment, the ratio between the elasticity coefficient and the mass of the sensor (material specific mass) of the material should have a minimal value such that the weight or inertial mass is deforming the resilient structures H1, H2 within the limits of the desired accuracy of the sensor.

The hysteresis in deformation of the material should be within the limits of the desired accuracy of the sensor.

The yield strength of the material should be within the limits of the maximum load of the sensor, not resulting in plastic deformation of the resilient structures H1, H2.

The above stated limitations lead in general to a preference for engineering materials like steel, aluminum and composite materials. A suitable material appeared to be 0.6, or more preferably 0.8 mm stainless steel. However, a suitable plastic material may alternatively be used for the resilient structures H1, H2.

Different transducers can be used converting the deformation of the hinges into electric signals. The most direct way is a measuring the strain in the resilient structures H1, H2 by strain gauges on the resilient structures H1, H2. Deformation can also be measured by measuring a change of position of the resilient structures H1, H2, or by measuring a change in position of the measurement probe P with (contactless) measurement methods like a Linear Variable Differential Transformer (LVDT), optical distance sensors, hall sensors, eddy current or capacitive sensors. When measuring the position change of the measurement probe P, it needs to be ensured that the arm A is sufficiently stiff so that crosstalk due to asymmetrical load is within the limits of the desired sensor accuracy.

Various embodiments provide the following advantages:

- Because the sensor can be made from a thin material, the weight is low. If the sensor is used in multiple orientations, the weight of the sensor plays a minor role.
- The sensor can be made from a thin material. If the sensor is used in dynamic situations, the inertia of the sensor plays a minor role and can easier be compensated.
- The material of the sensor is not limited anymore to materials that are easy to drill or mill, as are needed for a shear type load cell in which holes are drilled and from which material is removed so as to create hinges that allow the shear type load cell to deform. High strength materials like steel can be chosen resulting in a robust design not resulting in plastic deformation under load when a high load is applied.
- Forces caused by inertial mass are lower, because of lower mass of the sensor, especially in combination with high strength materials. Lower forces caused by lower inertial mass do have less (damaging) effect on high strength materials. Because the high strength materials allow a larger deflection in the resilient structures H1, H2, it is easier to limit the stroke preventing plastic deformation.
- The sensor is built from thin plate, not consuming much space. It fits in with smaller volumes.
- As a result of the simple construction, the sensor is in essence a cheap solution that can advantageously be used in a hair styling or analysis device.

Figure 1B:
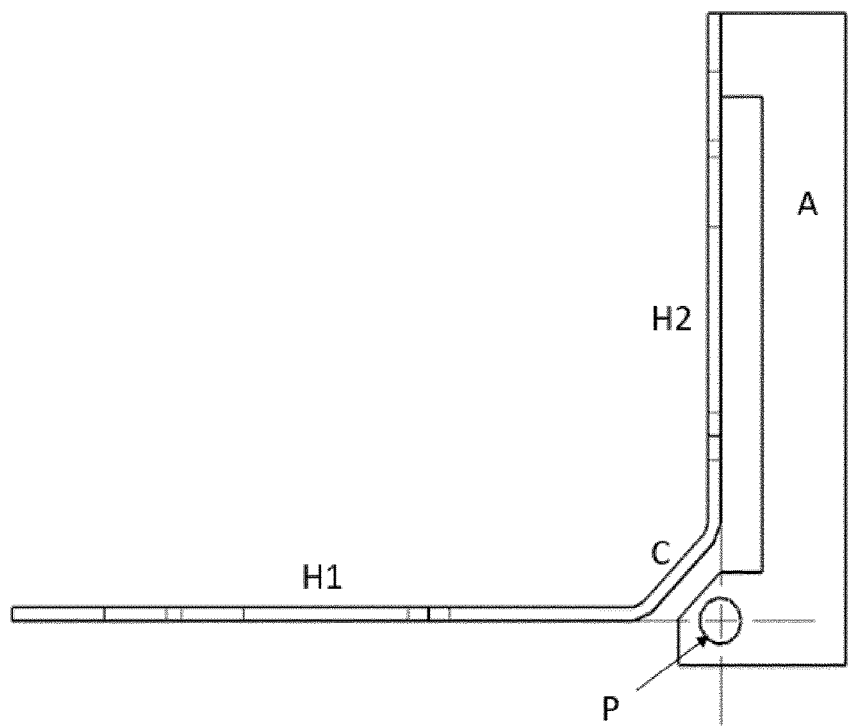

In the drawings, FIGS. 1A, 1B show a basic execution of the two-dimensional force sensor, in which in a rest position, the arm A ensures that the measurement probe P is positioned in line at a virtual crossing of the resilient plates H1, H2. A connection part C is present between the resilient plates H1, H2.

Figure 2:
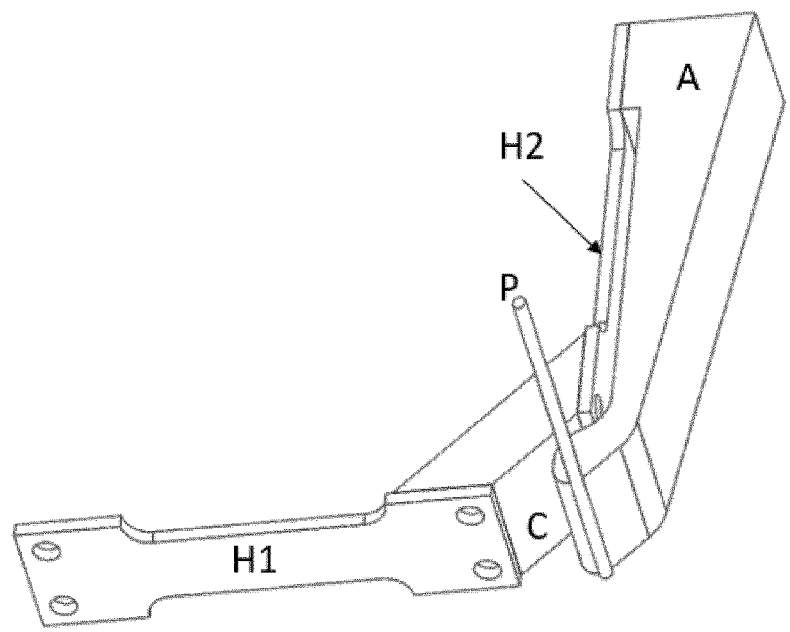

The view of FIG. 2 shows that the measurement position of the probe P (i.e. where the forces $F_X$, $F_Y$ act on the measurement probe) may be above the resilient plates H1, H2 by means of which these forces $F_X$, $F_Y$ are measured.

Figure 3:
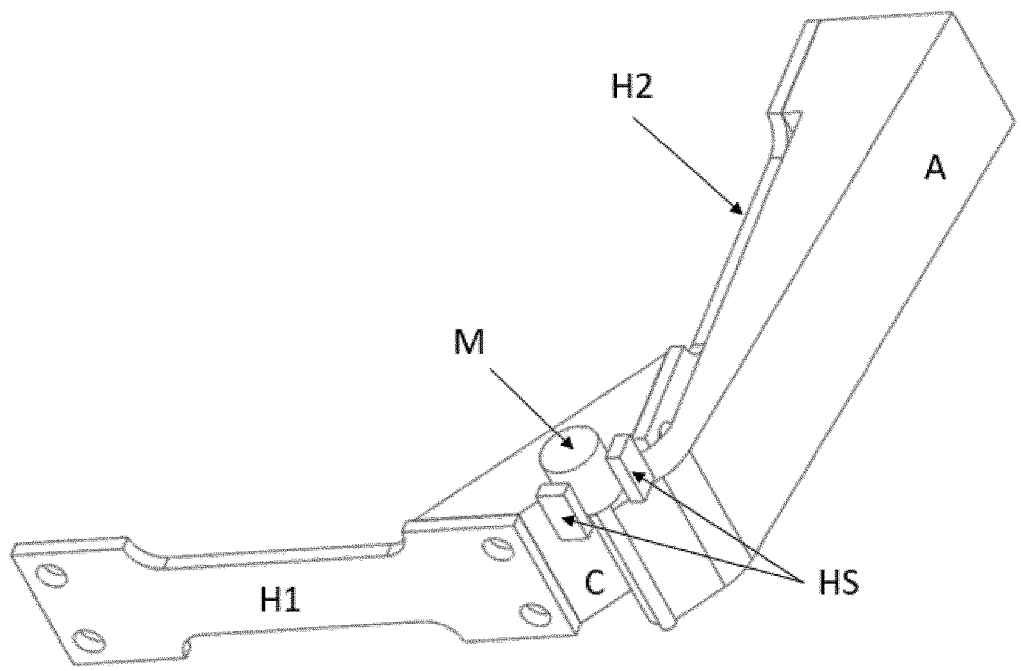

FIG. 3 illustrates an embodiment in which the movement of the measurement probe, and thus the forces $F_X$, $F_Y$, are measured by means of a magnet M on the measurement probe P and Hall effect sensors HS adjacent to the magnet M.

Figure 4:
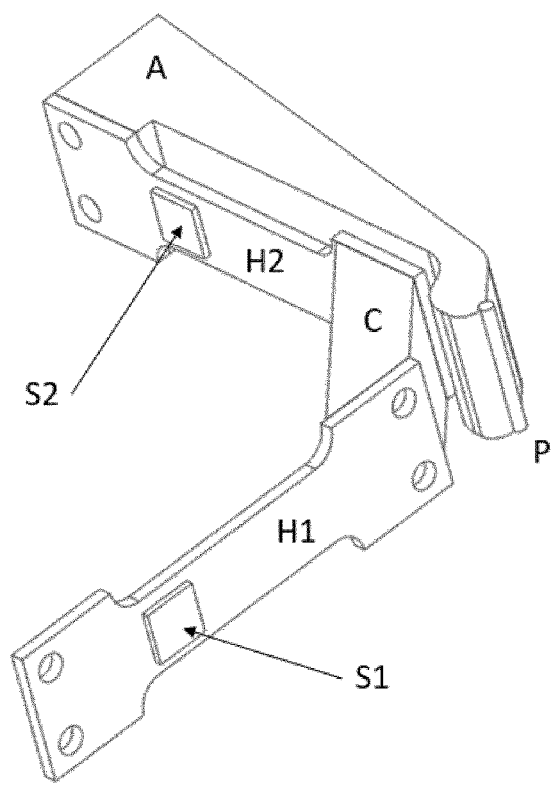

FIG. 4 illustrates a configuration with strain gauges S1, S2 mounted (e.g. glued) on the resilient plates H1, H2.

Figure 5:
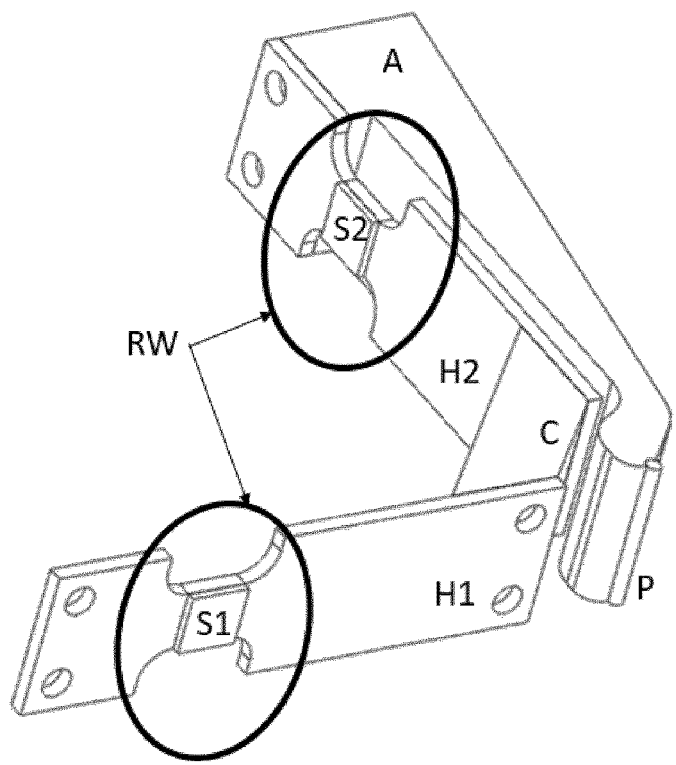

FIG. 5 illustrates an embodiment in material is removed from the resilient plates H1, H2 to create well-defined bending zones.

Figure 6A:
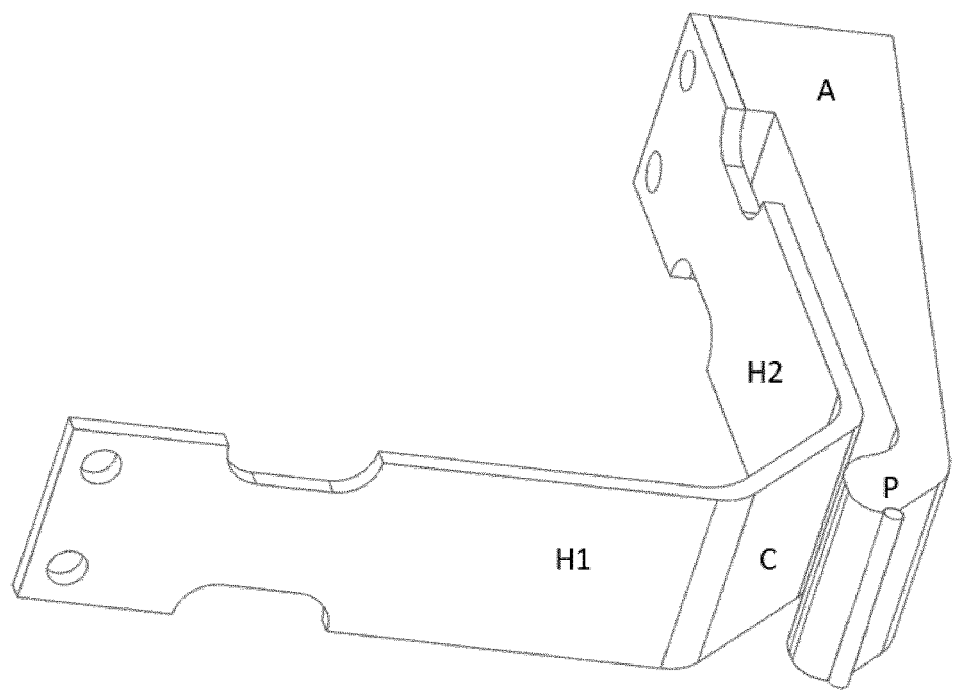
Figure 6B:
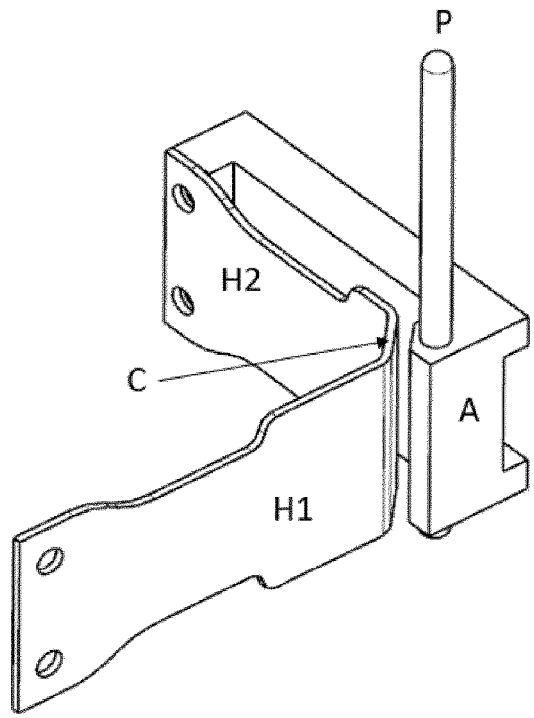

FIGS. 6A, 6B illustrate that the resilient plates H1, H2 may very well be part of a single plate that is suitably bent (in the connection region C) so as to allow room for the measurement probe P.

Figure 7:
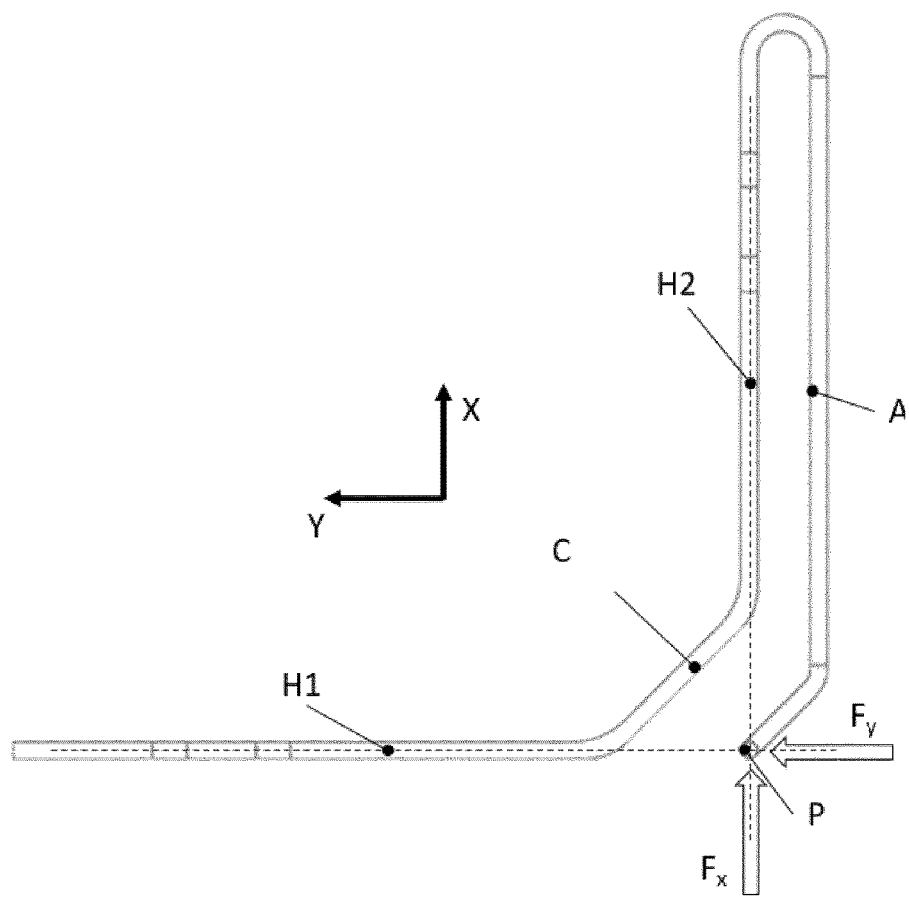

FIG. 7 shows that the arm A too may be part of this single plate that is suitably bent. If strain gauges are used to measure the forces, it suffices to have an arm A that is not more rigid than the resilient plates H1, H2.

Figure 8:
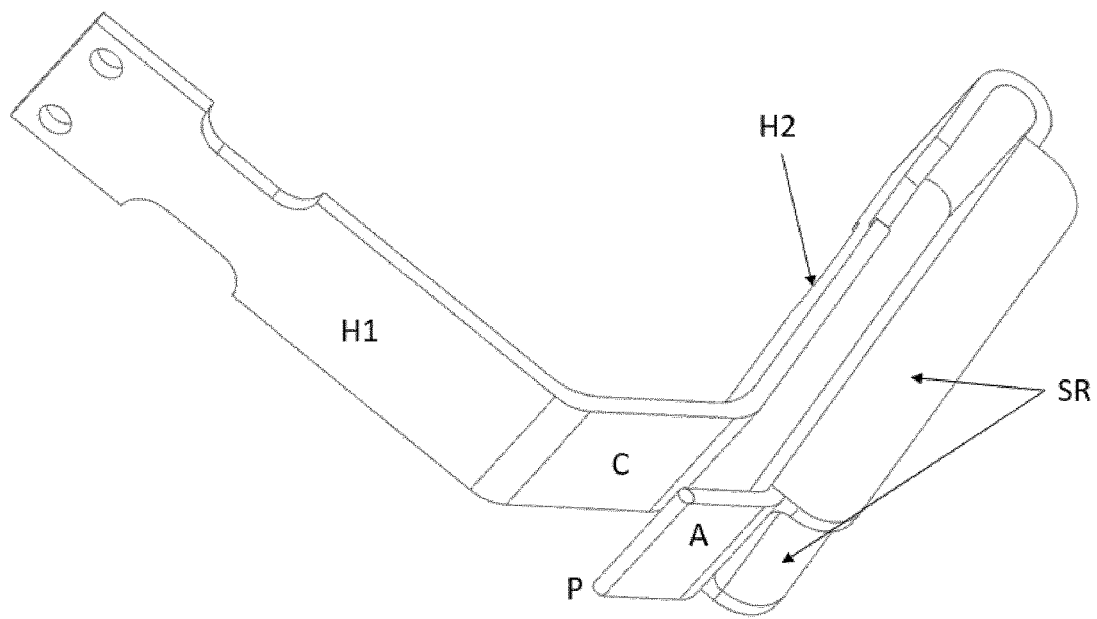

FIG. 8 shows an embodiment in which in the arm A, the single plate is bent so as to form stiffening ribs SR so as to ensure that the arm A is sufficiently stiff so that it hardly bends when forces are applied, so that the measurement of the forces is not disturbed. This is desirable in case a transducer is placed on the measurement probe P, e.g. when hall sensors HS are used to measure the forces, as shown in FIG. 3. FIG. 6B shows an alternative way to obtain a relatively stiff arm A which is separate from the plate that comprises the first resilient plate H1 and the second resilient plate H2. The stiffening ribs SR may be obtained in a different way than by bending a plate, e.g. by casting or extrusion molding.

The embodiments of FIGS. 1B, 6A, 6B, 7 and 8 provide the advantage that normal and friction forces can now be measured with a single load cell instead of an assembly of two different load cells.

If desired, stroke limiting protection measures may be applied, preventing a plastic deformation of the resilient plates H1, H2 in an over-loaded situation.

Various embodiments if the invention thus provide a load cell having a minimum number of components, that measures both normal and friction forces without cross influencing the measurements, and allowing calculation of the friction coefficient of the specimen after one measurement. By using flat bending plates, a good strength to stiffness ratio is achieved. The reduction in mass of the sensor assembly compared to an assembly of shear type load cells has improved the capabilities of the sensor to survive impact forces due to dropping on hard surfaces. The positioning of the measurement probe in the virtual cross-section point of the two load cell blades H1, H2 avoids cross interference of normal and friction force. The load cell can be produced using mass production techniques like laser cutting or stamping, where shear load cells often require hand tuning.

A key feature of the invention is the capability of measuring a normal force Fn and a friction force Ff with one sensor, and therefore the ability of calculating a friction coefficient $\mu=Ff/Fn$ with a single probe and sensor. At any place where a friction coefficient is measured with only one probe, this invention may be used. For example, in propositions where friction coefficients of hair or skin have to be measured. In other industries it may be useful to detect changes in surface finish or wear.

Figure 9:
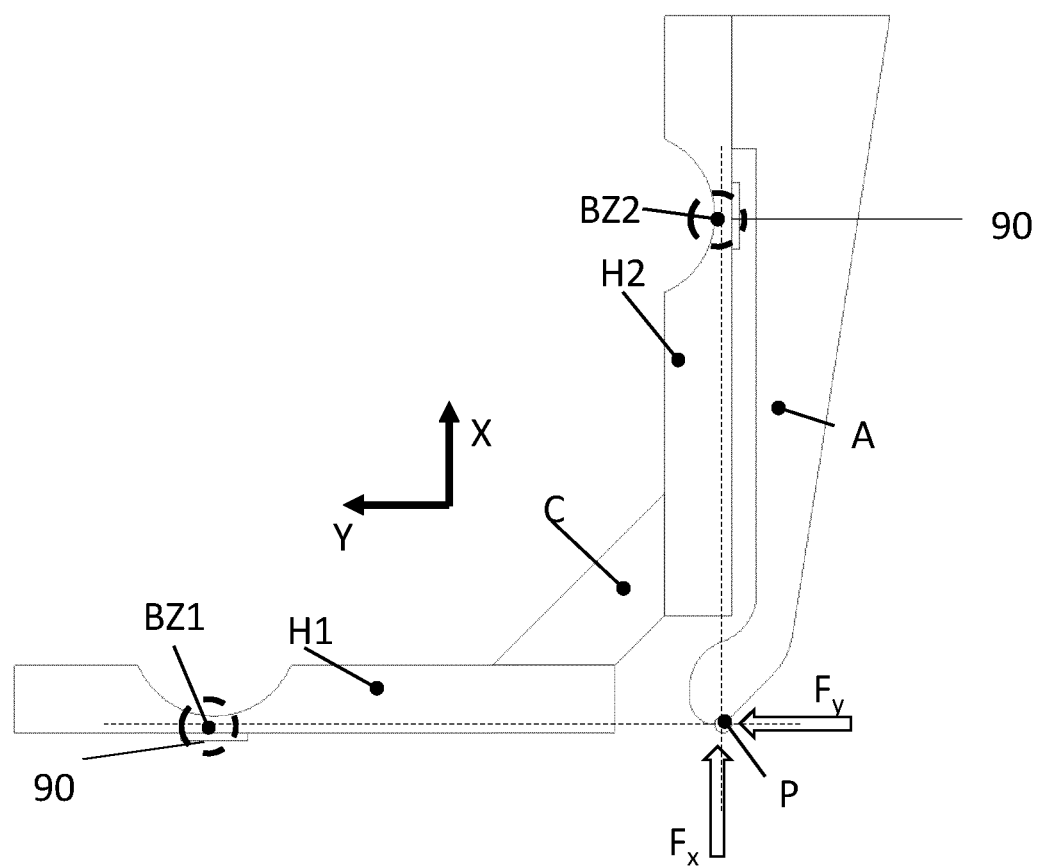

FIG. 9 diagrammatically shows a two-dimensional force sensor wherein the first and second resilient structures are beams H1, H2 each comprising a bending zone BZ1, BZ2. Strain measurement units 90 may be provided in the bending zones. The neutral axes of beams H1 and H2 are illustrated by means of dashed lines, which cross at the imaginary cross-section point. This is the location where measurement probe P is positioned.

It should be noted that the above-mentioned embodiments illustrate rather than limit the invention, and that those skilled in the art will be able to design many alternative embodiments without departing from the scope of the appended claims. There is no need for the first and second directions to be perpendicular to one another; they may, e.g. at 45° or 135° to one another. In the claims, any reference signs placed between parentheses shall not be construed as limiting the claim. The word "comprising" does not exclude the presence of elements other than those listed in a claim. The word "a" or "an" preceding an element does not exclude the presence of a plurality of such elements. The invention may be implemented by means of hardware comprising several distinct elements. In the device claim enumerating several means, several of these means may be embodied by one and the same item of hardware. Measures recited in mutually different dependent claims may advantageously be used in combination.

The invention claimed is:

1. A two-dimensional force sensor for measuring a first force in a first direction and a second force in a second direction different from the first direction, the two-dimensional force sensor comprising:
   a measurement probe;
   a first resilient structure oriented in the second direction and capable of being deformed in the first direction by the first force when induced on the measurement probe, a first end of the first resilient structure being arranged for being coupled to a reference point, wherein the first resilient structure is a resilient plate, or a beam comprising a bending zone; and
   a second resilient structure oriented in the first direction and capable of being deformed in the second direction by the second force when induced on the measurement probe, a first end of the second resilient structure being coupled to a second end of the first resilient structure, and a second end of the second resilient structure being coupled to the measurement probe, wherein the second resilient structure is a resilient plate, or a beam comprising a bending zone;
   wherein the measurement probe is mounted on an extension device mounted to the second end of the second resilient structure, the extension device being shaped for—in the absence of the first and second forces—positioning the measurement probe at an imaginary cross-section point of a neutral axis of the first resilient structure and a neutral axis of the second resilient structure, or at a position deviating from that imaginary cross-section point by no more than 20%, preferably no more than 10%, and more preferably no more than 5%, of a length of the extension device.

2. The two-dimensional force sensor as claimed in claim 1, wherein the first resilient structure is provided with a first strain measurement unit to measure the first force, and the second resilient structure is provided with a second strain measurement unit to measure the second force.

3. The two-dimensional force sensor as claimed in claim 2, wherein the first resilient structure and the second resilient structure have a reduced width at positions where the first resilient structure and the second resilient structure have been provided with the first strain measurement unit and the second strain measurement unit, respectively.

4. The two-dimensional force sensor as claimed in claim 1, further comprising a transducer for sensing a position deviation of the measurement probe to measure the first force and the second force.

5. The two-dimensional force sensor as claimed in claim 4, wherein the transducer comprises a Hall effect sensor for sensing a position deviation of a magnet that is coupled to the measurement probe.

6. The two-dimensional force sensor as claimed in claim 1, wherein the first resilient plate and the second resilient plate are part of a single resilient plate that is shaped to have a first section oriented in the second direction and a second section oriented in the first direction.

7. A hair styling or analyzing device provided with a two-dimensional force sensor as claimed in claim 1.

* * * * *